May 23, 1939.   A. C. LINDGREN   2,159,664
THRESHER
Filed Dec. 24, 1936   2 Sheets-Sheet 1
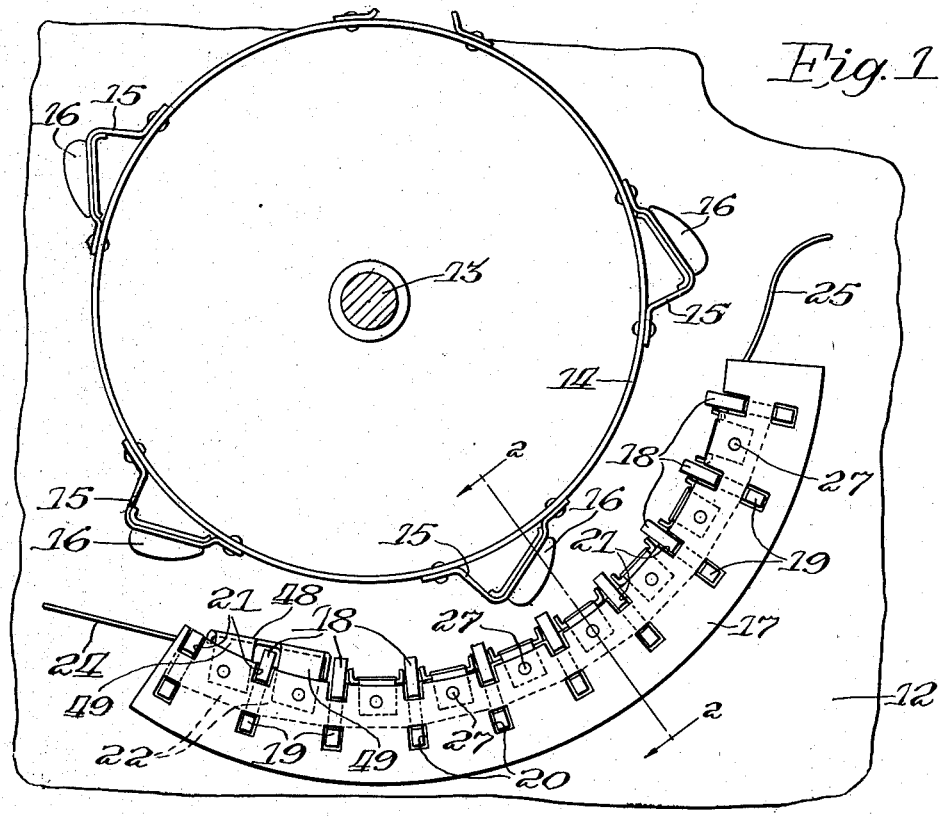
Fig. 1.
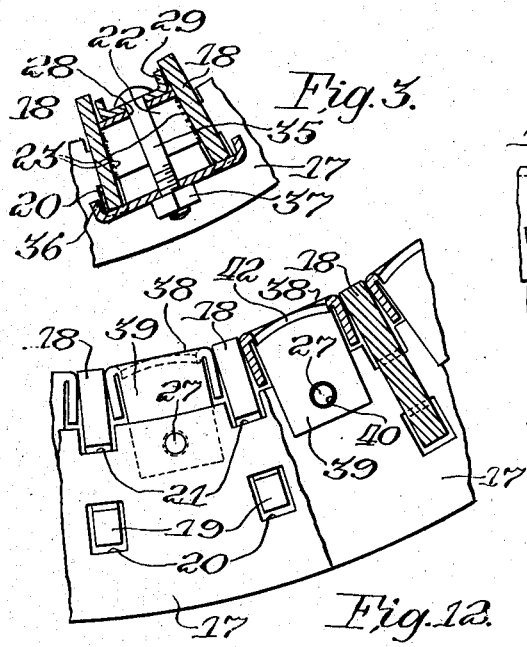
Fig. 3.
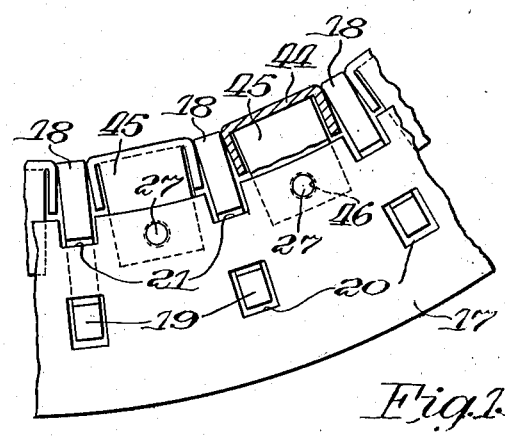
Fig. 13.
Fig. 12.
Inventor
Alexus C. Lindgren
By V. F. Lasaque
Atty.

May 23, 1939.  A. C. LINDGREN  2,159,664
THRESHER
Filed Dec. 24, 1936    2 Sheets-Sheet 2
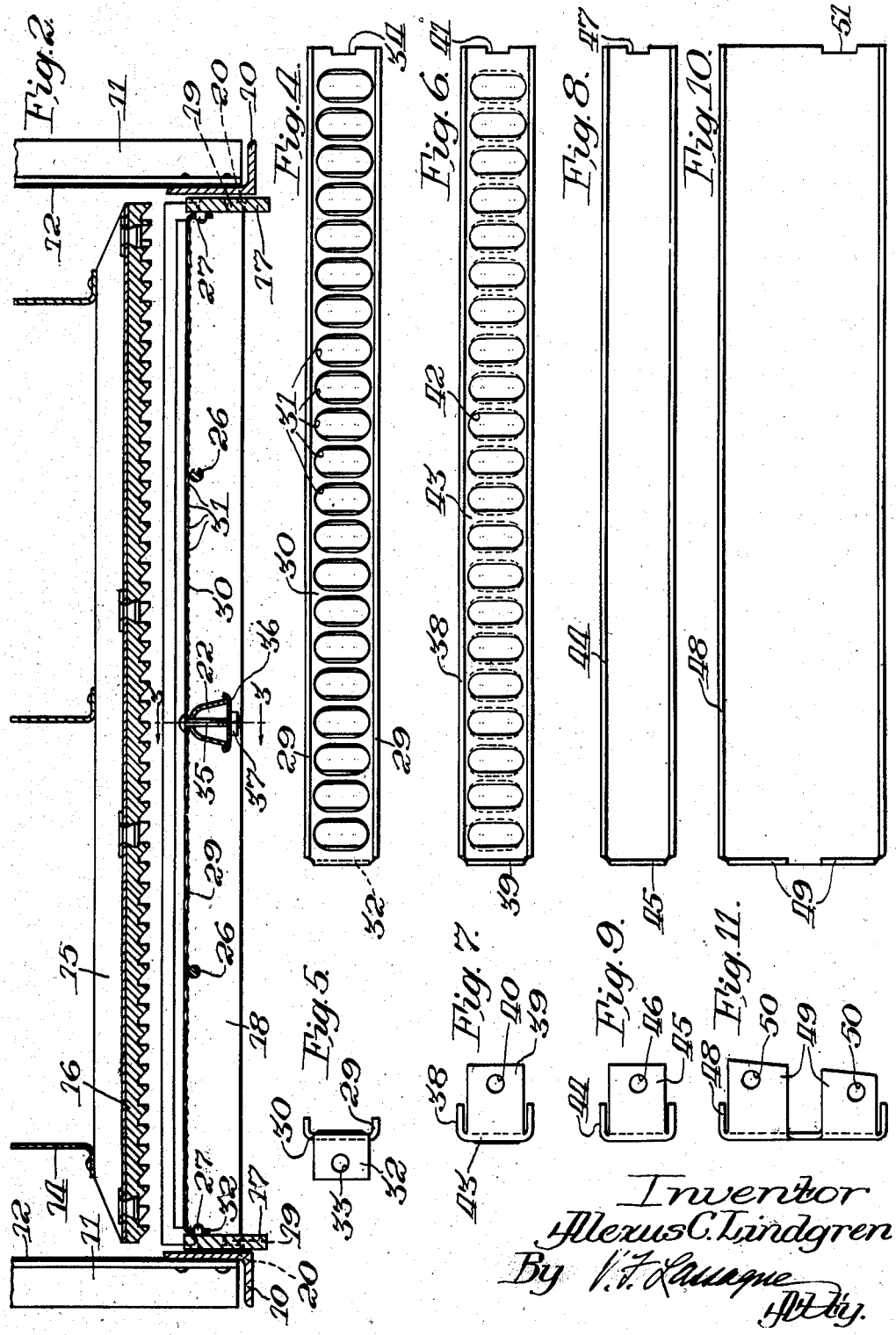
Inventor
Alexus C. Lindgren Patented May 23, 1939

2,159,664

UNITED STATES PATENT OFFICE 2,159,664

THRESHER

Alexus C. Lindgren, Chicago, Ill., assignor to International Harvester Company, a corporation of New Jersey Application December 24, 1936, Serial No. 117,568

3 Claims. (Cl. 130—27)

The invention relates to a thresher, and particularly to a concave structure adapted to be associated with the threshing cylinder thereof.

It is desirable in grain threshers, both of the stationary and traveling harvester thresher types, that the threshing mechanism be capable of threshing all kinds of grains as well as soy beans and other seeds. Threshing is effected in these machines between a high speed rotating threshing cylinder and a stationary concave operatively associated with the cylinder. When it is desired to thresh different kinds of grains, adjustment and reconstruction of the concave is desirable, to alter the threshing effect between the cylinder and concave in such a manner that the right action is produced without damaging the seeds. When soy beans are being threshed by the cylinder and concave, the latter must be so reconstructed that the severity of the threshing action will be considerably lessened to prevent damage to and cracking of the beans. So far as is known the concaves used with threshing cylinders of the rub bar type were not capable of reconstruction to make it possible effectively to thresh various sizes of grains and the like.

More particularly, the invention relates to an improved concave which may have its effective threshing surfaces altered in a simple and convenient manner through the utilization of quickly attachable and detachable insert plates, so as to vary the threshing effectiveness of the concave structure, depending upon the character of the crop being threshed.

Briefly, the usual concave structure embodies spaced arcuate side members cross-connected by spaced transverse, radially extending grate bars providing spaces therebetween through which the threshed grains may drop through the concave. The effectiveness of the threshing operation is determined by the grate bars, and this can be altered in accordance with the present invention by the provision of removable inserts adapted to be placed in the spaces between the grate bars. For example, if it is desired to make the grate ineffective for threshing, an insert is placed therebetween of blank structure to fill in the space between adjacent grate bars and make them ineffective for threshing action. Such blank inserts are useful when threshing soy beans to prevent cracking of the beans. Other types of inserts may be placed between these grate bars, such other inserts having screen openings therein of any required size to permit smaller grains threshed to drop therethrough. Further, these inserts are so constructed that any combination of them, whether blank or perforated, may be utilized to bring about any desired threshing effect.

The objects of the invention are:

To provide an improved concave structure for threshers;

To provide means whereby the concave may be adapted efficiently to handle all kinds of wheat and small grains as well as soy beans, and the like;

To provide insert members to be mounted between the grate bars of the concave of either perforate or imperforate form to alter the operation of the concave; and, lastly, To provide a simple and effective means for securing said insert members detachably in place.

An illustrative number of these concave inserts are disclosed in the accompanying sheets of drawings, in which:

Figure 1 is an end view of a thresher with an inner wall of the housing removed to disclose the cylinder and concave structure;

Figure 2 is a transverse cross-sectional view through the cylinder and concave structure, taken along the line 2—2 of Figure 1, looking in the direction of the arrows;

Figure 3 is a longitudinal cross-sectional view through the concave structure, taken along the line 3—3 of Figure 2, looking in the direction of the arrows, to illustrate the manner of interconnecting and bracing the concave grate bars;

Figures 4 and 5 are, respectively, plan and end views of a form of concave insert, perforated to adapt it for use when wheat and similar small grains are to be threshed;

Figures 6 and 7 are, respectively, plan and end views of a modified form of grate bar insert, perforated in a manner to adapt it for use in connection with threshing soy beans;

Figures 8 and 9 are, respectively, plan and end views of a blank or imperforate insert adapted to be located in the space between two adjacent grate bars to make said bars ineffective when threshing soy beans;

Figures 10 and 11 are, respectively, plan and end views of a double width blank or imperforate grate bar insert adapted to block out two adjacent grate bar spaces, said double width insert also being usable when soy beans are threshed;

Figure 12 is a fragmentary end view of the concave with a portion thereof broken away and sectioned to illustrate the mounting and location on a larger scale of the type of insert shown in Figures 6 and 7; and, Figure 13 is a similar view of a portion of the concave illustrating the type of imperforate insert in place, depicted in Figures 8 and 9.

For the sake of illustration, a standard form of thresher is shown embodying a frame 10 carrying upright angle bar supports 11, to which are connected the opposite side walls 12 of the thresher housing. Properly carried in said housing is a transverse, horizontal cylinder shaft 13 for mounting and driving a thresher cylinder 14 of the rub bar type, the same carrying in appropriately spaced angular relationship transverse brackets 15 for carrying threshing elements in the form of serrated rub bars 16.

Below the cylinder 14, the frame bars 10 of the thresher housing carry in the usual manner oppositely disposed arcuate side plates 17, which at angularly spaced intervals carry the usual transverse grate bars 18, said bars extending radially inwardly toward the cylinder 14 and projecting some distance above the inner diameter of the arcuate side plates 17. The lower portion of each opposite end of each grate bar 18 is provided with a projection 19 to fit into an opening 20 formed in the side plates 17, and the upper portion of each end of each grate bar 18 is formed with a similar projection to overhang and fit into appropriate notches 21 formed along the inner diameter edge of each said side plate 17. Further, along the longitudinal median line of the grate structure there are provided inverted U-shaped spacer blocks 22, which are wedged between adjacent grate bars 18, as shown in Figures 2 and 3, with the ends of said spacer blocks welded, as at 23, to the grate bars 18. In this fashion the grate bars 18 are rigidly united and properly held in place.

The forward end of the grate structure, as shown in Figure 1, is provided with an apron 24, and the rearward or discharge end of the concave is provided with an apron 25.

In the threshing operation, the cylinder 14 is rotated counter-clockwise, and the material is fed between the cylinder and the concave from the left, as viewed in Figure 1, over the apron 24, and the action of the rub bar 16 cooperating with the upwardly projecting edges of the grate bars 18 serves to thresh and rub the seeds from the straws, with the shelled grain falling downwardly through the grate structure of the concave in a well known manner, the straw remaining being moved rearwardly and upwardly by the cylinder 14 to pass off to the right, as viewed in Figure 1, over the apron 25, into the usual separator and winnowing mechanism included in the thresher to the rear of same and not shown in this disclosure because it is unnecessary.

The grate bar structure 18 is further tied together by a longitudinally disposed rod 26 located on each side of the concave, as indicated in Figure 2. Further, in each grate bar space between the bars 18, the inner sides of the side plate 17 rigidly carry small pins 27, which are aligned transversely in pairs in each of said grate bar spaces. Also in each grate bar space, each spacer 22 at its upper end, as shown in Figure 3, is formed with an opening 28 for a purpose later to appear.

When wheat or similar small grains are to be handled by the concave and cylinder, removable inserts of the kind shown in Figures 4 and 5 are employed in the spaces between the grate bars 18. In this form of insert it will be seen that the same is composed of a sheet metal strip in channel form, as shown at 29, said strips including a cross connecting web portion 30 having openings 31 suitably formed therein from one end to the other. At one end, the channel strip 29 has a right angularly bent flap portion 32 provided with an opening 33, while the other end of said strip has a notch 34 formed therein, as shown in Figure 4. It will be observed that this strip 29 is one-half the width of the concave. When placing this strip 29 in position, as shown in Figure 2, the flap end 32 is placed against the left hand side plate 17 with the hole 33 passing over the stud 27, and the inner end of said strip 29 is thus arranged with its notch 34 overlying the upper edge of the cross-connector 22 adjacent the hole 28 therein. The strips 29 are laid on top of the wires or rods 26, as shown in Figure 2. Another strip of the same construction is turned around end for end and similarly connected between the cross-connector 22 and the opposite side plate 17 of the grate structure. There are thus no lefts or rights required for the strips, for either side is the same. With the two strips 29 thus laid end to end with their inner notched ends over the opening 28, a carriage type bolt 35 is dropped through from the top side of the adjacent notched ends of the strips 29 into the cross-connector 22. The legs of the U-shaped cross-connector 22 carry a plate 36, through which the bolt 35 passes, so that, by means of a nut 37 on the back side of the plate 36, the assembly may be securely but detachably connected in place.

In the grate bar structure shown for the concave, as shown in Figure 1, there are nine grate spaces between the cross grate bars 18, and, as a consequence, if it is desired to reconstruct the entire area of the concave, it will be necessary to provide eighteen of the perforated channel strips 29, since two are necessary to fill each grate bar space.

In Figures 6 and 7, another form of channel strip 38 is shown, the same at one end having an ear 39 with a hole 40 therein and at its other end being provided with a notch 41. This strip has holes 42 therein of a different shape, and, further, it is to be noted that the channel sides and the ear 39 extend in the same direction from the flat surface of the strip, which surface is shown at 43. This strip, as shown in Figures 6 and 7, is an insert adapted for use when soy beans are threshed, the same presenting a substantially smooth upper surface to reduce the threshing action. The said channel strips 38 for use in threshing soy beans are shown mounted in place between the grate bars in the concave structure in Figure 12, and it will be understood that the mounting thereof on the pins 27 and the securement of the inner ends thereof to the cross-connector 22 are identical with that heretofore described for the insert or strip 29.

When soy beans are being threshed, it may be desirable also to blank out some of the grate bars 18 and make them ineffective, thereby to reduce the area of the concave and lessen the threshing action to prevent damage to the beans. Accordingly, blank strips of a single width, such as shown in Figures 8 and 9, and designated by the numeral 44, may be provided. Said strips 44 are imperforate and also have a wing 45 at one end with an opening 46 therein and a notch 47 at the other end of the strip 44. These strips 44 are inserted in place between adjacent grate bars 18 in the manner heretofore described to blank out the spaces between the grate bars and also to make the latter ineffective for any cooperative threshing action with the rub bars 16 or equivalent threshing elements on the threshing cylinder 14.

In Figures 10 and 11, there is shown another imperforate or blank type of channel insert designated by the numeral 48, the same being of a double width and having two wings 49 at one end, each of which is provided with an opening 50, whereas the other end of the double width blank insert or strip is formed with a single notch 51 disposed off center, as shown. This double width blank insert 48 is mounted in place between the grate bars in the manner indicated in Figure 1, where it will be seen that by this means three grate bars are made ineffective for threshing purposes.

When small grains are to be threshed, it will be understood that each grate bar space will carry, in the manner heretofore described, a pair of channel strip inserts of the kind designated by the numeral 29 in Figures 4 and 5.

When soy beans are to be threshed, some of the grate bar spaces may be blanked out by the single width channel shaped inserts 44, and some may be blanked out by the double width inserts 48, as shown in Figure 1. Some of the grate bar spaces, since some threshing is desired when operating on soy beans, will be filled with channel strip inserts of the type shown in Figures 6 and 7.

The provision of the insert strips of this invention obviously makes it possible to arrange the concave structure in the desired manner to make it effective for cooperation with the threshing cylinder in the handling of any kind of grain or other seeds, such as soy beans and the like. Any combination of different types of strips with the desired size of screen openings may be utilized at any one time, or the entire grate structure may be provided with all of one kind of strips, or it may be entirely blanked out, if desired, so that none of the grate bars is effective for threshing purposes. In the latter case, the concave would be practically smooth.

The inserts all have a generic common structure in that they are all channel shaped and adapted to be detachably mounted at one end in the side plate of the concave structure, and at the other end adapted to rest on and be secured to appropriate supports, such as the central cross-connectors 22.

It can now be appreciated that, by means of these inserts, a standard concave can be made effective for use in handling wheat and small grains of all kinds, as well as soy beans and the like, without any great trouble, since it is a simple matter to mount the inserts in place between the grate bars in any manner desired, or to remove them.

It is the intention to cover herein all changes and modifications of the form of the invention herein disclosed which do not in material respects constitute departures from the spirit and scope of the invention.

What is claimed is:

1. In a thresher concave having spaced arcuate side plates and a pair of angularly spaced grate bars cross-connected therebetween, a spacer connecting said bars substantially midway between their ends, the combination with said bars of insert members adapted to occupy the space between the plates, said members being substantially half the width of the concave and arranged end to end in said space with their outer ends respectively secured detachably to the side plates and their inner ends respectively resting on and being detachably secured to the spacer.

2. In a thresher concave having spaced arcuate side plates and a pair of angularly spaced grate-bars cross-connected therebetween, a spacer connecting said bars substantially midway between their ends, the combination with said bars of insert members adapted to occupy the space between the plates, said members being substantially half the width of the concave and arranged end to end in said space with their outer ends respectively including an angularly related end piece adapted for detachable connection to an adjacent side plate, the inner ends of said members resting on the spacer, and means for detachably securing said inner ends of said members to the spacer.

3. In a thresher concave having spaced arcuate side plates and a pair of angularly spaced grate bars cross-connected therebetween, a spacer connecting said bars substantially midway between their ends, the combination with said bars of insert members adapted to occupy the space between the plates, said members being substantially half the width of the concave and arranged end to end in said space with their outer ends respectively including an end piece adapted for mounting on an adjacent side plate, the inner adjacent ends of the members adapted to rest on the spacer, said members being channel-shaped in cross section, and means for securing the said inner ends of the members to the spacer.

ALEXUS C. LINDGREN.